United States Patent [19]

Rey et al.

[11] Patent Number: 4,680,531
[45] Date of Patent: Jul. 14, 1987

[54] METHOD FOR ATTENUATING AT LEAST ONE ELECTRIC HARMONIC OF THE SYSTEM FREQUENCY IN A MULTI-PHASE ALTERNATING-CURRENT SYSTEM

[75] Inventors: Antoine Rey, Basel; Herbert Stemmler, Kirchdorf, both of Switzerland

[73] Assignee: BBC Brown, Boveri & Company, Limited, Baden, Switzerland

[21] Appl. No.: 898,019

[22] Filed: Aug. 19, 1986

[30] Foreign Application Priority Data

May 15, 1986 [DE] Fed. Rep. of Germany ....... 3616334

[51] Int. Cl.⁴ .............................................. G05F 1/70
[52] U.S. Cl. .................................... 323/206; 323/210
[58] Field of Search ......................... 323/206, 208–211

[56] References Cited

U.S. PATENT DOCUMENTS 4,104,576  8/1978  Frank .................................. 323/210
4,567,424  1/1986  Dobsa et al. ........................ 323/210

FOREIGN PATENT DOCUMENTS 0054414  3/1983  Japan ................................. 323/210

OTHER PUBLICATIONS

Fiebiger et al., "Thyristor Static Compensator for the Cern Intermediate Booster Accelerator", ACEC Rev. (Belgium), No. 3 (1980), pp. 2–6.
H. E. Schweickardt et al., Closed Loop Control of Static Var Sources (SVS) on EHV Transmission Lines, 11/15/77.
P. V. Goosen et al., FC/TCR Type Static Compensators in Escom's 132 kV Network, 1984 Session–29th Aug.–6th Sep.

Primary Examiner—Peter S. Wong
Attorney, Agent, or Firm—Oblon, Fisher, Spivak, McClelland, & Maier

[57] ABSTRACT

A method for attenuating at least one unwanted harmonic, particularly the second harmonic, with respect to the system frequency in a multi-phase alternating current system, wherein an additional stabilizing circuit is installed into a conventional current/voltage controller including a current/voltage controller and a three-phase firing pulse generator in a reactive-power compensator connected via a reactive-power transformer and a current transformer to a 50 Hz three-phase system. The reactive power compensator has for each phase of the three-phase current at least one air choke, which is connected via a current transformer and via an alternating-current switch via another sum-current transformer to a secondary winding of the reactive-power transformer. In addition, the reactive-power compensator has for each phase of the three-phase current at least one capacitor bank or a capacitor, which is connected via a current transformer and an alternating-current switch (13) to the sum-current transformer (20). The stabilizing circuit measures a harmonic-containing magnetising current as the difference between compensator current ($i_K$) and sum current ($i_{Su}$) on the primary and secondary side of the reactive-power transformer, and by means of a voltage transformer a system-frequency voltage signal, which is proportional to the system frequency. These two three-phase current and voltage signals are converted into a single direct-voltage signal in a reactive-power meter. An input harmonic of 100 Hz occurs on the output side as a 50 Hz signal which is filtered out in a bandpass filter and, after a +90° phase shift, is added in an adding section to the conventional output signal of the current/voltage controller via a double-sided limiter.

19 Claims, 7 Drawing Figures

METHOD FOR ATTENUATING AT LEAST ONE ELECTRIC HARMONIC OF THE SYSTEM FREQUENCY IN A MULTI-PHASE ALTERNATING-CURRENT SYSTEM

BACKGROUND OF THE INVENTION

Field of the Invention

This invention relates to a method for attenuating at least one electric harmonic of the system frequency in a multi-phase alternating-current system precharacterizing clause of claim 1.

Discussion of Background

Prior art method for attenuating at least one electric harmonic of the system frequency in a multiphase alternating-current system is described by P. V. Goosen and others, FC/TCR Type Static Compensators in ESCOM's 132 kV Network, International Conference on Large High-Voltage Electric Systems, 29.8.-6.9.1984 in Paris, Cigre Paper No. 38-09, pages 1-9, 1984. In this paper delta-connected series-resonant circuits or air chokes for static reactive-power compensators are in each case connected in series with alternating-current swtiches which have antiparallel thyristors, via a saturable 35-MVA transformer to a 132-kV alternating-current sytem. If the transformer goes into magnetic saturation at high currents, an unwanted first harmonic of the system frequency is created in the power supply system. Especially the instability caused by the second harmonic is attenuated by the direct-current component, caused by it, in the alternating current of the reactive-current compensator being detected by means of special direct-current transformers and corrected by means of a slow integral-action controller. A separate voltage control is provided for each branch of the delta circuit. In addition, a filter for the second harmonic is installed into the high-power circuit.

It is disadvantageous that a separate control circuit and additionally a filter tuned to the harmonic are required for each branch of the delta circuit.

SUMMARY OF THE INVENTION

Accordingly, one object of this invention is to provide a novel method for attenuating at least one electric harmonic of the system frequency in a multiphase alternating-current system, which enables effective damping to be achieved by simpler means than is possible based on the prior art method.

The above object, and others, is achieved according to the invention by providing a new and improved method for attenuating at least one electric harmonic with respect to the system frequency in a multi-phase alternating-current system, to which is connected at least one impedance by a magnetically saturable transformer and at least one phase-controlled alternating current switch, wherein the switch is controlled as a function of an equidistant control signal of a current-/voltage controller and a stabilizing signal is generated as a function at least of the current through the at least one impedance. According to the invention, at least one electric power signal having an active and/or reactive power component is generated as a function of the input voltage of the transformer and as a function of the stabilizing signal. Each power signal is subjected to at least one frequency filtering for each electric harmonic to be compensated and is then phase displaced by +90° before it is superimposed on the equidistant output signal of the current/voltage controller as a control signal for the alternating-current switches.

One advantage of the invention is that a reduction of the outlay for an attenuation of unwanted harmonics. One control circuit having a single stabilizing signal for all controllable impedance branches connected to the saturable transformer is sufficient. No individual control of each phase of the alternating-current switch is necessary. The stabilizing effect is achieved by the control of the alternating-current switch alone. An additional expensive harmonics filter designed for high currents is not required.

According to an advantageous development of the invention, normal alternating-current transformers are sufficient for measuring the currents since viturally only the currents of the second harmonic need to be detected. Since the direct-current component does not have to be measured, no expensive and elaborate high-precision direct-current transformers are needed.

Additional reference with respect to the relevant prior art is made to Schweikardt and others, Closed Loop Control of Static Var Sources (SVS) on EHV Transmission Lines, IEEE PES A 78 135-6, 1978, from which a current/voltage controller for a three-phase firing pulse generator is known which can be used in conjunction with the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
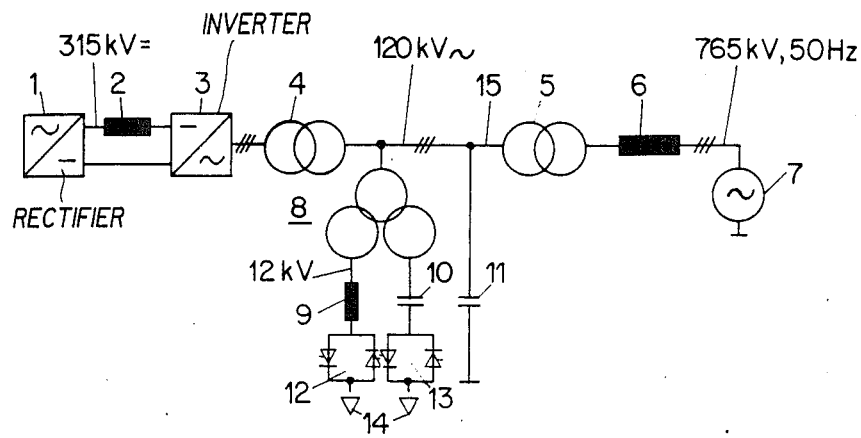
FIG. 1 is a block diagram of a typical reactive-power compensator which is connected to a three-phase system via a reactive-power transformer in which harmonics which are to be attenuated can occur.

Referring now to the drawings, wherein like reference numerals designate identical or corresponding parts throughout the several views, in FIG. 1, numeral 1 designates a rectifier which is connected via direct-current link to a link choke 2 comprising an inverter 3 to a high-voltage direct-current transmission system. The direct link voltage is 315 kV. The link choke is dimensioned for a power of 1 GW. The inverter 3 feeds, via a high-voltage direct-current transmission system transformer 4, a three-phase system 15 having an alternating voltage of 120 kV. The three-phase system 15 is connected via a step-down transformer 5 to another three-phase power supply system which has a system impedance 6, a 50-Hz alternating voltage of 765 kV and a system voltage source 7. The three-phase system 15 is also connected via a magnetically saturable reactive-power transformer 8, the secondary-side alternating voltage of which is 12 kV, to an air choke 9, designed for a reactive power of 2×120 MVA and a capacitor bank, designed for a reactive power of 2×150 MVA. The air choke 9 and reactive-power capacitor bank 10 can be controlled via series-connected alternating-current actuators or switches 12 and 13 which have antiparallel thyristors. The controllable air choke 9 is delta-connected to two other controllable air chokes, not shown, of the two other voltages phases, which is indicated by a triangle characterized by 14. The controllable reactive-power capacitor bank 10 is delta-connected in the same manner. In addition, the three-phase system is grounded via a filter capacitor 11 which is dimensioned for a reactive power of 300 MVA.

Such a system, consisting of alternating-current switch 12, air choke 9, alternating-current switch 13, capacitor bank 10, reactive-power transformer 8, filter capacitor 11, high-voltage direct-current transmission transformer 4, high-voltage direct-current transmission 1-3, step-down transformer 5, system impedance 6 and system voltage source 7 can become unstable and oscillate at the first harmonic (100 Hz) of the system frequency of 50 Hz when the system gain is large enough at the first harmonic, that is to say when the impedance at the terminating point of the reactive-power transformer 8 is large at the first harmonic and when the alternating-current swtich 12 is driven between 90° and 180°. The instability occurs even when firing pulses are emitted to the alternating-current switch 12 which are equidistant with respect to the alternating system voltage.

The second harmonic instability corresponding to the first harmonic is a closed self-exciting functional circuit. For better understanding, it is assumed that a small voltage with the second harmonic of the system frequency is superimposed on the system voltage at the connecting point of the reactive-power transformer 8. This produces a direct-current component in the alternating-current switch 12. The direct-current component generates a unidirectional flux component in the iron core of the reactive-power transformer 8 so that its magnetization current becomes unsymmetrical and contains even harmonics, especially also the second harmonic. This second harmonic current sees a large impedance at the connecting point of the reactive-power transformer 8 and generates a second harmonic voltage across this impedance. This closes the functional circuit for the second harmonic instability.

Figure 2:
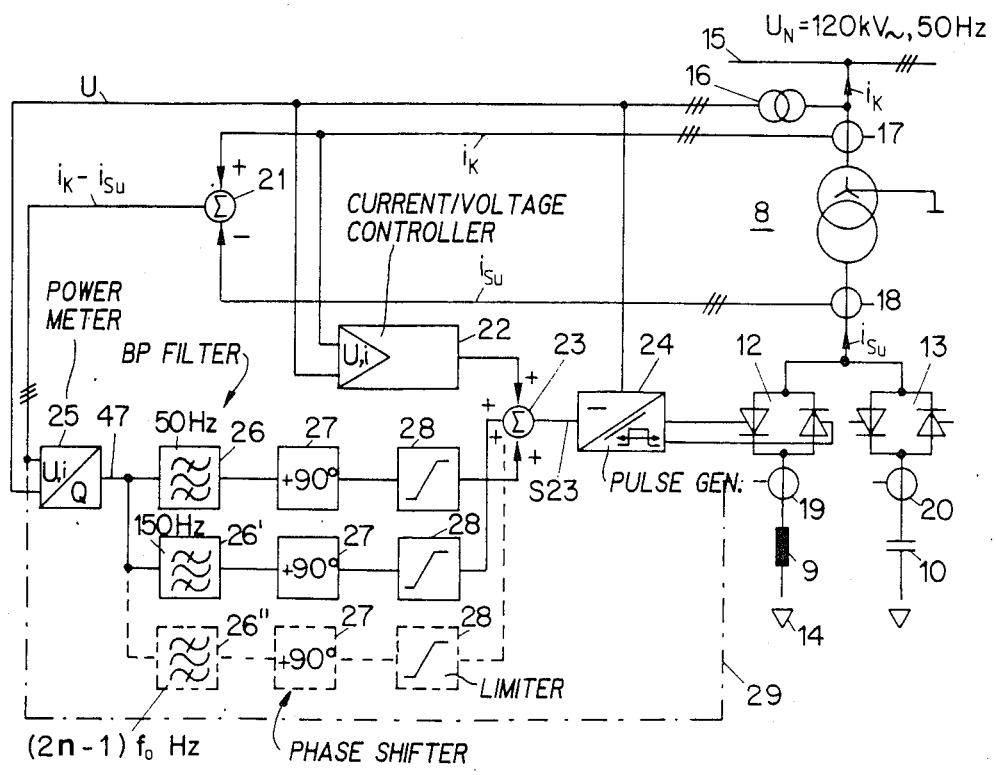
FIG. 2 is a schematic block diagram a first illustrative embodiment of a controller circuit for compensating harmonics in conjunction with a reactive-power compensator according to FIG. 1.

FIG. 2 shows a stabilization circuit for attenuating harmonics, which can be installed in addition to a current/voltage or reactive-power controller already known and enables stable operation of the reactive-power compensator to be achieved. In all Figures, identical parts are provided with the same reference designations.

The system voltage $U_N$ of 120 kV/50 Hz of the three-phase system 15 is present via a current transformer 17 at the star-connected primary winding of the reactive-power transformer 8 which is grounded at its neutral point. $i_K$ designates the compensator current and a compensator current signal proportional to it at the output of the current transformer 17. The secondary winding of the reactive-power transformer 8 is connected via a current transformer 18, on the one hand, to an alternating-current switch 12 and, on the other hand, to an alternating-current switch 13. $i_{Su}$ designates a sum current through the two alternating-current switches 12 amd 13 and a sum current signal, proportional to it, at the output of the current transformer 18.

On the other hand, the alternating-current switch 12 is connected via a current transformer 19 in series with the air choke 9 and in a star connection to two other controlled air chokes, not shown, of the other two voltage phases. The alternating-current switch 13 is connected via a current transformer 20 in series with the reactive-power capacitor 10 and in star connection to two other controlled reactive power capacitors, not shown, of the other two voltage phases. The two alternating-current switches 12 and 13 are provided with their control signals by a current/voltage controller 22 via an adding section 23 and via a three-phase firing pulse generator 25, connected to the output of the former, as are known, for example, from the above-mentioned IEEE Publication A 78 135-6.

The current/voltage controller 22 supplies, as a function of the compensator current signal $i_K$ and of a voltage signal U which is proportional to the system voltage $U_N$, a single control signal S23 via the adding section 23 to the firing pulse generator 24. At its input, the firing pulse generator 24 is additionally connected to the secondary-side output of a voltage transformer 16. The voltage signal U can be tapped off at the secondary winding of the voltage transformer 16. On its primary side, the voltage transformer 16 is connected to the three-phase system 15.

The compensator current signal $i_K$ is fed to the "+" input, and the sum-current signal $i_{Su}$ to the "−" input of an adding section 21. At its output, the adding section 21 is connected to a current signal input of the reactive-power meter 25 described in greater detail in conjunction with FIG. 3. A voltage signal input of the reactive-power meter 25 is supplied with the voltage signal U from the output of the voltage transformer 16 which serves at a the same time as frequency reference value. At the output 47, the reactive-power meter 25 supplies a reactive-power signal Q as a direct-voltage value on which any harmonics of the frequencies $(2n-1) \cdot f_o$, n integrally $\geq 1$, $f_o$ = system frequency = 50 Hz, are superimposed. Since the reference frequency for the reactive power meter 25 is 50 Hz, the first harmonic of 100 Hz appears relative to the reference frequency $f_o$ having a frequency of 50 Hz.

The output 47 of the reactive-power meter is connected to a bandpass filter 26 which passes 50 Hz oscillations, also to a bandpass filter 26' which passes 150 Hz oscillations, and to one or possibly several bandpass filters 26" which pass oscillations of the frequencies $(2n-1) \cdot f_o$, $n \geq 3$. These bandpass filters 26, 26' and 26" are in each case connected at the output via +90° phase shifters or stabilizing filters, known per se, to also commercially available double-sided limiters 28. The outputs of these limiters 28 are each connected to one "+" input of the adding section 23.

Instead of the magnetization current $i_K-i_{Su}$ of the reactive power transformer 8 at the output of the adding section 21, the current signal input of the reactive power meter 25 can be supplied with the current output signal of the current transformer 19 via the signal line 29, drawn in dashes.

The stabilizing circuit consists of the detection of the signal to be stabilized (magnetization current $i_K-i_{Su}$, or current through the air choke 9), the conversion of the three-phase signal into a single signal (U, i/Q transformation), at least one bandpass filter which filters out the stabilizing signal(s), at least one phase shifter and one adder which adds the stabilizing signal (s) to the output signal of the normal current/voltage controller 22.

If only the second harmonic is to be attenuated, the bandpass filters 26' and 26" with subsequent 90° phase shifters and double-sided limiters can be omitted.

Figure 3:
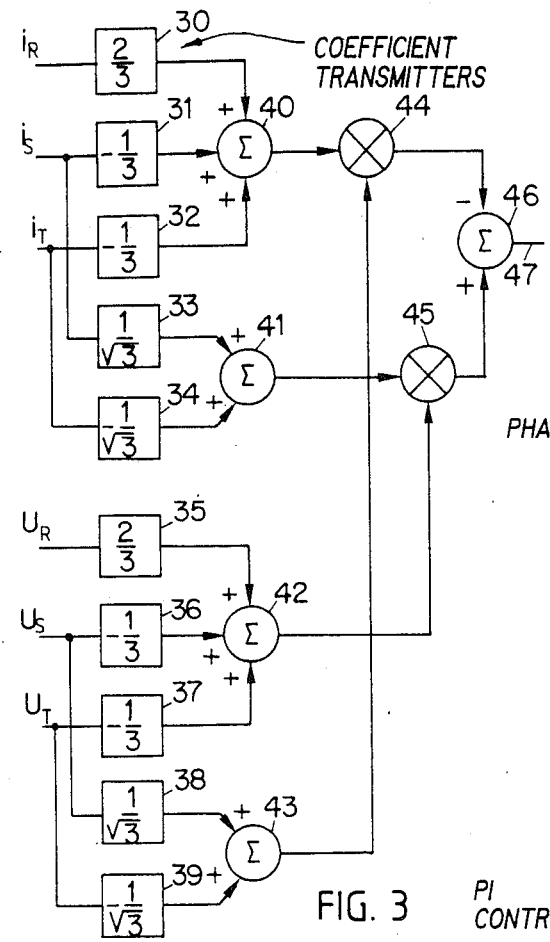
FIG. 3 is a block diagram of a reactive-power meter of the controller circuit according to FIG. 2.

FIG. 3 shows a block diagram of a reactive-power meter 25. $i_R$, $i_S$, $i_T$ designate phase current signals at the inputs which are supplied by the output of the adding section 21 or by three current transformers 19, only one current transformer 19 being represented in FIG. 2. $U_R$, $U_S$, $U_T$ designate phase voltage signals at the inputs which are supplied by the output of the voltage transformer 16. Numerals 30-39 designates coefficient transmitters having coefficients specified in the blocks, numerals 40-43 designates adding sections having "+" inputs, numerals 44 and 45 designate multipliers and numeral 46 designates an adding section which is connected via a "−" input to the output of the multiplier 44 and via a "+" input to the output of the multiplier 45. At the output 47, the wanted reactive-power signal Q is obtained on the direct-voltage value of which a 50-Hz oscillation is superimposed if the system voltage displays a second harmonic of 100 Hz.

Figure 4:
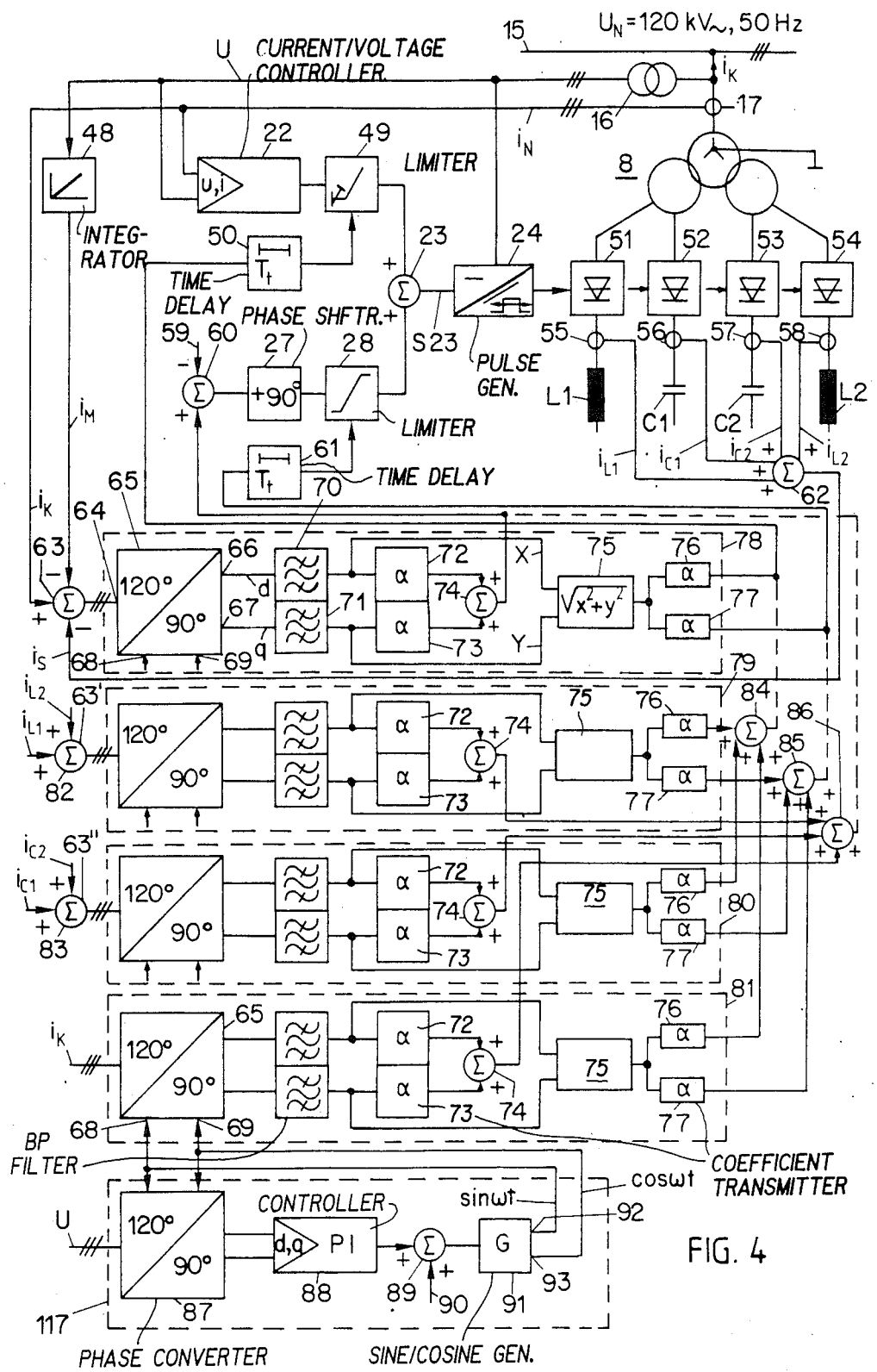
FIG. 4 is a schematic block diagram of a second illustrative embodiment of a controller circuit for compensating harmonics, in which active and reactive power are detected as measured variable and are related to a system-frequency reference value.

In the illustrative embodiment of the invention according to FIG. 4, the reactive power compensator has for each phase four alternating-current switches 51-54, which are connected to the secondary windings of the reactive-power transformer 8, with impedances L1, C1, C2, L2 which are in each case connected in series with the former via current transformers 55-58, L1 and L2 being air chokes or inductances and C1, C2 being capacitor banks or capacitors. All four impedances of a three-phase current phase are connected to the four impedances each of the two other three-phase current phases in a delta circuit (not shown). The current signals at the output of the current transformers 55-58 are designated by $i_{L1}$, $i_{C1}$, $i_{C2}$, $i_{L2}$ and are fed to "+" inputs of an adding section 62 the output of which is connected to a "−" input of an adding section 63.

The input of the current/voltage controller 22 is connected to the outputs of the voltage and current transformers 16 and 17 and the output is connected via a limiter 49 with an adjustable one-sided limit value to a "+" input of the adding section 23. The single output signal S23 of the latter controls the three-phase firing pulse generator 24 which supplies control pulses to the alternating-voltage switches 51-54.

The compensator current signal $i_K$ is fed from the output of the current transformer 17 to a "+" input of the adding section 63. Another "−" input of the adding section 63 is connected via an integrator 48 to the secondary-side output of the voltage transformer 16. The output of the integrator 48 supplies a magnetizing current signal $i_M$ of the reactive-power transformer 8

$$I_M = (1/L) \int U_N dt,$$

where L is a constant which corresponds to the main inductance of the reactive-power transformer 8. $i_M$ measures the component of fundamental frequency of the magnetizing current and not the component of any magnetic saturation peaks which may be present.

The output signal of the adding section 63 thus supplies the magnetic saturation component of the current which may occur in consequence of current harmonics and is utilized for its attenuation. The output of the adding section 63 is connected to the input 64 of a three-phase/two-phase coordinate converter 65 which is described in greater detail in conjunction with FIG. 6.

From a reference frequency signal control set 117, other inputs 68 and 69 of the three-phase/two-phase coordinate converter 65 are supplied with system-frequency reference frequency signals sin $\omega t$ and cos $\omega t$, phase-shifted by 90° relative to each other, $\omega = 2\pi f_o$ = angle of frequency, t = time. At the outputs 66 and 67 of the three-phase/two-phase coordinate converter 65, an active power signal d, which is fed to the input of a bandpass filter 70, and a reactive power signal q, which is fed to the input of a bandpass filter 71, can be tapped off. The two bandpass filters 70 and 71 allow 50 Hz oscillations to pass so that their output signals x and y are characteristic of the amplitudes of the active and reactive power components of the second harmonic of 100 Hz. Referred to the reference frequency of 50 Hz in the three-phase/two-phase coordinate converter 65, the second harmonic of 100 Hz, contained in the current input signals at input 64, appears at outputs 66 and 67 with a frequency of 100 Hz−50 Hz=50 Hz. The signals x and y are fed via coefficient transmitters or adjusting potentiometers 72 and 73 to "+" inputs of an adding section 74 where they are added and then fed to the "+" input of another adding section 60. A "−" input of the adding section 60 is supplied with a setpoint 59 which equals zero. At the output, the adding section 60 is connected by a +90° phase shifter 27 and via a stabilizing filter for the second harmonic and subsequently via a double-sided limiter 28 to a "+" input of the adding section 23. The two coefficient transmitters 72 and 73 are first set to the value or factor of "1" and are then increased in value until a compensation of the harmonics has been achieved.

At the same time, the signals x and y are fed to an absolute-value generator 75 in which the amplitudes of these signals are squared and the square root is drawn from the square. At the output, the absolute-value generator 75 is connected via a coefficient transmitter 76 and via a timing section 50 with predeterminable time delay to an input of the limiter 49 where the output signal of the timing section 75 is used for setting the limit value of the limiter 49. In addition, the output of the absolute-value generator 75 is connected via another coefficient transmitter 77 and via a timing section 61 with predeterminable delay to an input of the double-sided limiter 28 where the output signal of the timing section 61 is used for setting the two limit values of the limiter 28. The components designated by 65-77 are combined to form an harmonics analyzing circuit 78 indicated by dashes.

According to this differential current method, in which the sum of the secondary currents and, in addition, of the magnetizing current are subtracted from the primary current, transformer saturations can be readily corrected or prevented. The individual currents are trimmed in such a manner that a resultant current of zero is obtained in the case of non-saturation.

Instead of this above-mentioned differential current method, a sum current method can also be used in which only the choke current signals $i_{L1}$ and $i_{L2}$ of current transformers 55 and 58 are fed to an adding section 63' and/or only the capacitor current signals $i_{C1}$ and $i_{C2}$ of current transformers 56 and 57 are fed to an adding section 63" as harmonics-containing input signals. The outputs of the adding section 63' and 63" are in each case connected to harmonics evaluating circuits 79 and 80 which are of the same construction as the abovementioned harmonics circuit 78. It is also possible to feed only the compensator current $i_K$ directly to the three-phase input of the three-phase/two-phase coordinate converter 65 of a harmonics evaluating circuit 81 which is of the same construction as the harmonics analyzing circuit 78. The outputs of the coefficient transmitters 76 of the harmonics analyzing circuits 79-81 are in each case connected to a "+" input of an adding section 84 the output of which is connected to the input of the timing section 50. The outputs of the coefficient transmitters 77 of the harmonics analyzing circuits 79-81 are in each case connected to a "+" input of an adding section 85 the output of which is connected to the input of the timing section 61. The outputs of the adding sections 74 of the harmonics circuits 79-81 are in each case connected to a "+" input of an adding section 86, the output of which is connected to the "+" input of the adding section 60.

The input limiting in limiter 49 is used for creating spare control capacity for controlling the thyristors of the alternating-current switches 51-54. The greater the amplitudes of the second harmonic, the greater the spare control capacity; but it does not disappear if the second harmonic does not occur. It is important that as little spare control capacity as possible is used so that as much capacitive reactive power as possible is available.

The double-sided limiting in the limiter 28 as a function of the magnitude of the second harmonic occurring is used for the purpose that normal control via the current/voltage controller 22 cannot be too extensively impaired.

The reference frequency signal control set 117 is provided with a three-phase/two-phase coordinate converter 87 the three-phase input of which is supplied with the voltage signal U from the secondary-side output of the voltage transformer 16, which has reference signal inputs supplied with the reference frequency signals sin $\omega t$ ad cos $\omega t$ from outputs 92 and 93 of a sine/cosine generator 91, and the two-phase outputs of which are connected to the signal inputs of a proportional/integral-action or PI controller 88. The output of the PI controller 88 is connected to a "+" input of an adding section 89 the output of which is connected to a control input of the sine/cosine generator 91. A second "+" input of the adding section 89 is supplied with a frequency setpoint 90, corresponding to the system requency $f_o$ of 50 Hz.

Figure 5:
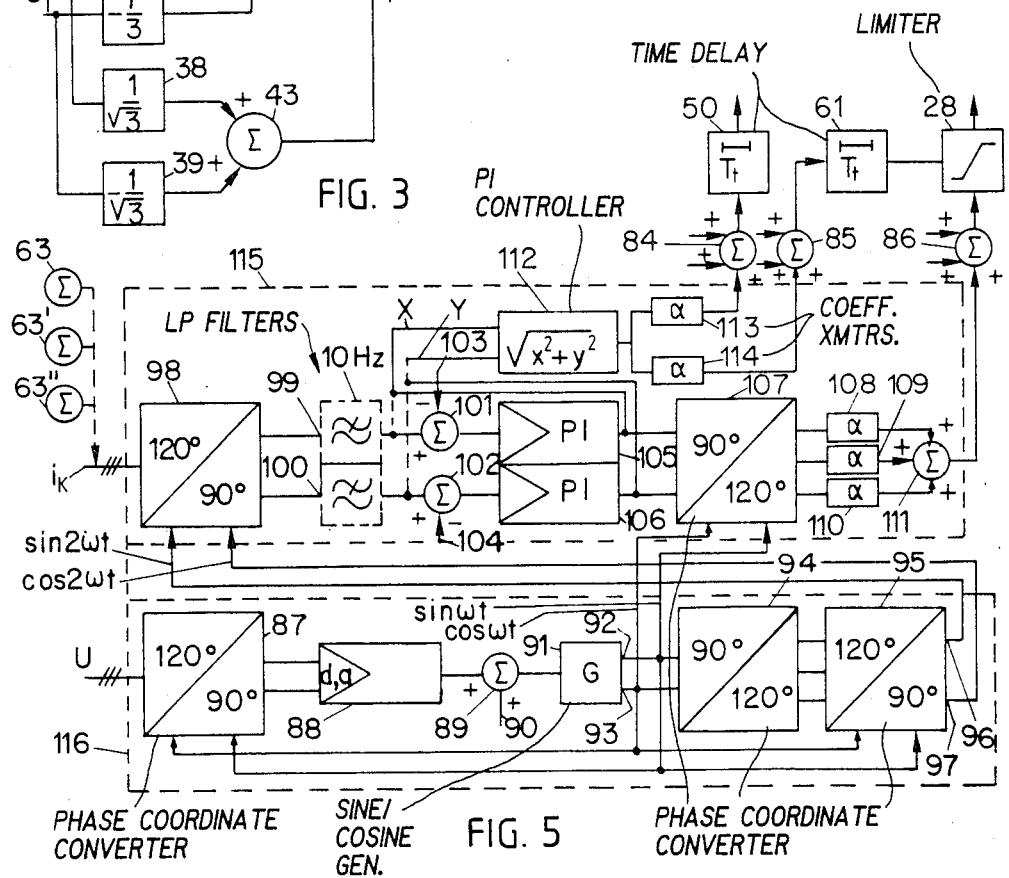
FIG. 5 is a schematic block diagram of a third illustrative embodiment of a controller circuit for compensating harmonics, in which active and reactive power are detected as measured variable and are related to the first harmonic of the system frequency as reference value.

FIG. 5 shows a harmonics stabilizing circuit which essentially differs from that shown in FIG. 4 only with respect to having a different harmonics analyzing circuit 115 and a different reference frequency signal control set 116. For this reason, essentially only that which is different is shown and mentioned in the text which follows.

The frequency reference signal for the three-phase/two-phase transformation has here the frequency of the second harmonic and not that of the system frequency $f_o$ as in the harmonics stabilizing circuit according to FIG. 2.

A three-phase/two-phase coordinate converter 98 of the harmonics stabilizing circuit 115 is supplied at the input with the harmonics-containing compensator current $i_K$ and reference frequency signals sin $2\omega t$ and cos $2\omega t$, phase shifted by 90° with respect to each other, from signal outputs 96 and 97 of a three-phase/two-phase coordinate converter 95 of the reference frequency signal control set 116. The active power and the reactive power output of the three-phase/two-phase coordinate converter 98 is in each case directly connected to the "+" input of an adding section 101 and 102 (low-pass filters 99 and 100, drawn in dashes, must be mentally omitted). "−" inputs of the adding sections 101 and 102 are supplied with set-point signals 103 and 104 with the setpoint 0. The outputs of the two adding sections 101 and 102 are connected via PI controllers 105 and 106 to the two-phase inputs of a two-phase/three-phase coordinate converter 107. Reference frequency signal inputs of the two-phase/three-phase coordinate converter 107 are connected to the outputs 92 and 93 of a sine/cosine generator 91 of reference frequency signal control set 116, which sine/cosine generator 91 supplies system-frequency signals sin $\omega t$ and cos $\omega t$. The three outputs of the two-phase/three-phase coordinate converter 107 are each connected via a coefficient transmitter 108 and 109 and 110 for weighting to one "+" input each of an adding section 111 the output of which is connected to a "+" input of the adding section 86. The output of the adding section 86 is directly connected to the control signal input of the double-sided limiter 28, without interposition of the adding section 60 and of the 90° phase shifter 27 according to FIG. 5. The output signal of the limiter 28 is again supplied to the adding section 23, see FIG. 4. The output signals x and y of the PI controllers 105 and 106 are also fed to an absolute-value generator 102. The output signal of this generator is fed, on the one hand, via a coefficient transmitter 113 to a "+" input of the adding section 84 and, on the other hand, via a coefficient transmitter 114 to a "+" input of the adding section 85. The output of the adding section 84 is connected via the timing section 50 to the limiter 49, not shown in FIG. 5. The output of the adding section 85 is connected via the timing section 61 of the limiter 28.

In addition or alternatively to the harmonics analyzing circuit 115, harmonics analyzing circuits of the same construction can be provided which obtain at their inputs the output signals of the adding sections 63' and 63" according to FIG. 4. The signal outputs of these harmonics analyzing circuits are then correspondingly fed to "+" inputs of the adding sections 84, 85 and 86. The harmonics analyzing circuit 115 is preferably supplied with the output signal of the adding section 63 according to FIG. 4 instead of the compensator current $i_K$, in which arrangement the adding sections 84, 85 and 86 are omitted.

The reference frequency signal control set 116 according to FIG. 5 is of the same construction with respect to components 87-91 as the reference frequency signal control set 117 according to FIG. 4. The outputs 92 and 93 of the sine/cosine generator 91 are connected via a two-phase/three-phase coordinate converter 94 to the three-phase/two-phase coordinate converter 95 which supplies at its outpts 96 and 97 the sin $2\omega t$ and cos 2 ωt signal and the reference frequency signal inputs of which are connected to outputs 92 and 93.

Instead of the adding sections 101 and 102 and the subsequent PI controllers 105 and 106 of the harmonics analyzing circuit 115, low-pass filters 99 and 100 can also be provided which block frequencies above 10 Hz since the second harmonic is here present as a direct-voltage signal. At low-pass filters 99 and 100, the signals x and y can be tapped off at the outputs.

Figure 6:
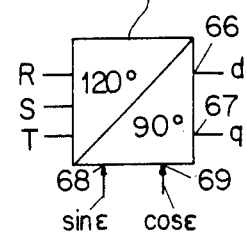
FIG. 6 is a block diagram of a three-phase/two-phase coordinate converter according to FIGS. 4 and 5.

Referring to FIG. 6, a three-phase/two-phase coordinate converter (65, 87, 95, 98) shall now be explained which transforms three values R, S and T of a three-phase system into corresponding values of a right-angle d-, q-coordinate system. The angle between the two coordinate systems is called ϵ; it transforms the R, S, T values into a right-angle α, β coordinate system. In this case, the α vector corresponds with the R vector. The transformation equations are:

$$\alpha = R,$$

$$\beta = (1/\sqrt{3}) \cdot (S - T),$$

$$d = \alpha \cdot \cos \epsilon + \beta \cdot \sin \epsilon,$$
$$q = -\alpha \cdot \sin \epsilon + \beta \cdot \cos \epsilon.$$

Figure 7:
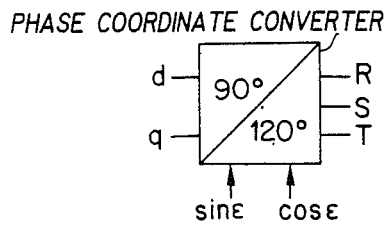
FIG. 7 is a block diagram of a two-phase/three-phase coordinate converter according to FIG. 5.

Referring to FIG. 7, a two-phase/three-phase coordinate converter (94, 107) is explained which transforms two values of a right-angle d-, q-coordinate system into three vectors of a three-phase coordinate system. ϵ designates the angle between the two coordinate systems. The right-angle d, q coordinates are transformed into right-angle α, β coordinates by a rotation around the angle ϵ. The transformation equations are:

$$\alpha = d \cdot \cos \epsilon - q \cdot \sin \epsilon,$$
$$\beta = d \cdot \sin \epsilon + q \cdot \cos \epsilon,$$
$$R = \alpha,$$

$$S = -0,5 \cdot \alpha + 0,5 \cdot \sqrt{3} \cdot \beta,$$

$$T = -0,5 \cdot \alpha - 0,5 \cdot \sqrt{3} \cdot \beta.$$

The circuits according to FIGS. 4 and 5 are designed for measuring and attenuating the second harmonics. Naturally, other harmonics can also be measured and attenuated, if necessary additionally, in similar manner as explained in conjunction with FIG. 2. In that case additional harmonics analyzing circuits must be provided which are tuned to these harmonics.

The system frequency $f_o$ can naturally also be, for example, 60 Hz instead of 50 Hz.

Instead of the alternating-current switches 12, 13 and 51-54 with two anti-parallel thyristors, several such altenating-current switches can also be connected in series.

In the case of the circuits according to FIGS. 4 and 5, the active power component d and/or the reactive power component q can be weighted, added or subtracted before they are supplied to the stabilizing filter of the second harmonic, the output signal of which acts directly in three-phase mode, not with individual phases, on the firing pulse generator 24.

In the circuit according to FIG. 5, two of the three coefficient transmitters 108-110 can have the coefficient 0. It is essential that only one control signal S23 is used for controlling all three phases. Preferably, the signal analysis and generation of the control signal S23 occurs in digital form by means of a fast microprocessor. Alternating-current systems containing already existing conventional reactive-power compensators can be supplemented by this means in simple manner and attenuated with respect to interfering harmonics.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for attenuating at least one electric harmonic with respect to the system frequency in a multiphase alternating-current system, to which is connected at least one impedance by a magnetically saturable transformer and at least one phase-controlled alternating current switch which is controlled as a function of an equidistant control signal of a current/voltage controller, comprising:
    generating a stabilizing signal as a function at least of the current through said at least one impedance;
    generating at least one electric power signal as a function of the input voltage of the transformer and as a function of at least the current through one impedance;
    filtering each power signal for each electric harmonic to be compensated;
    phase-displacing each filtered power signal by +90°; and
    superimposing each filtered and phase-displaced power signal on the equidistant output signal of the current/voltage controller for use as a control signal for the alternating-current switches.

2. Method according to claim 1, comprising:
    monitoring each filtered, phase-displaced power signal for phase limit value transgressions of predetermined upper and lower limit values, and in the case of limit value transgressions, limiting the filtered and phase-displaced power signal to the lower or upper limit value, respectively, including selecting the phase limit values dependent on the amplitude of the harmonics to be attenuated such that greater limiting results with greater amplitude; and
    adding each stabilizing signal thus limited to the equidistant output signal of the current/voltage controller.

3. Method according to claim 2, comprising:
    weighting each stabilizing signal before phase-displacement, such that the weighted stabilizing signal assumes a value of zero in the case of nonsaturation of the transformer, and such that it is delayed in time by a predetermined first time interval before it is added to the equidistant output signal of the current/voltage controller.

4. Method according to claims 1, 2 or 3, comprising:
    forming the stabilizing signal as a function of a primary input current of the magnetically saturable transformer.

5. Method according to claims 1, 2 or 3, comprising:
    forming the stabilizing signal as a function of the sum of the inductive currents of an inductive impedance connected to the magnetically saturable transformer.

6. Method according to claims 1, 2 or 3, comprising:

forming the stabilizing signal as a function of the sum of capacitive currents of a capacitive impedance connected to said magnetically saturable transformer.

7. Method according to claim 1, wherein capacitive and inductive impedances are connected to said magnetically saturable transformer, comprising:
   forming the stabilizing signal based on a differential current formed by the sum of the inductive and capacitive currents of the inductive and capacitive impedances subtracted from a primary-side input current of said transformer.

8. Method according to claim 7, comprising:
   deriving a transformer magnetizing current by integrating the input voltage of said transformer and subtracting the transformer magnetizing current from the differential current thus formed.

9. Method according to claim 1, wherein each said power signal has active and reactive power components, comprising:
   performing a measurement of the harmonics by deriving the active and reactive power components by means of a three-phase/two-phase coordinate transformation from selected input signals, including said current through said at least one impedance and a voltage related to system voltage, which contain the harmonics, referenced against a system-frequency reference frequency (sin $\omega t$, cos $\omega t$);
   subjecting each electric power signal to at least one bandpass filtering tuned to one of the frequencies $(2n-1)\cdot f_o$, n being an integer $\geq 1$, $f_o$ = system frequency;
   quadratically adding, for the two power components, the two band-pass filtered output signals;
   forming the square root of the quadratically added power components;
   unilaterally limiting the equidistant output signal of the current/voltage controller as a function of the square root of the quadratically added power components such that the current/voltage controller has increasing spare control capacity with increases in value of the square root, corresponding to a greater amplitude of the harmonic to be attenuated.

10. Method according to claim 9, wherein the square root signal is weighted and delayed by a predetermined second time interval before it limits the equidistant output signal of the current/voltage controller.

11. Method according to claims 3, 7, 8, 9 or 10, wherein the alternating-current system is a three-phase system and each alternating current switch is driven in three phases and at least one bandpass filter is tuned to the system frequency.

12. Method according to claim 4, wherein the alternating-current system is a three-phase system and each alternating current switch is driven in three phases and at least one bandpass filter is tuned to the system frequency.

13. Method according to claim 5, wherein the alternating-current system is a three-phase system and each alternating current switch is driven in three phases and at least one bandpass filter is tuned to the system frequency.

14. Method according to claim 6, wherein the alternating-current system is a three-phase system and each alternating current switch is driven in three phases and at least one bandpass filter is tuned to the system frequency.

15. Method according to claim 1, wherein each said power signal has active and reactive power components, comprising:
   performing a measurement of the harmonics by deriving the active and reactive power components means of a three-phase/two-phase coordinate transformation from selected input signals, including said current signal through said at least one impedance and a voltage related to system voltage, which contain the harmonics, referenced against a reference signal having the frequency of the second harmonic with respect to the system frequency;
   subjecting each power component subsequently to a low-pass filtering step to produce respective filtered output signals;
   quadratically adding together the two filtered output signals; and
   unilaterally limiting the equidistant output signal of the current/voltage controller as a function of said square root signal, such that the current/voltage controller has increasing spare control capacity with increases in value of the square root signal, corresponding to a greater amplitude of the harmonic to be attenuated.

16. Method according to claim 15, wherein the square root signal is weighted and delayed in time by a predetermined second time interval before it limits the equidistant output signal of the current/voltage controller.

17. Method according to claims 15 or 16, wherein the alternating current system is a three-phase system and each alternating-current switch is driven in three phases, and the output signal of each low-pass filtering step is subjected to a two-phase/three-phase coordinate transformation referenced against a system-frequency reference frequency before it is phase-shifted by 90°.

18. Method according to claim 1, wherein each power signal has active and reactive power components, comprising:
   performing a measurement of the harmonics by deriving the active and reactive power components by means of a three-phase/two-phase coordinate transformation from selected input signals, including said current signal through said at least one impedance and a voltage related to system voltage, containing the harmonics, referenced against a reference signal having the frequency of the second harmonic with respect to the system frequency;
   subjecting each power component subsequently to a proportional/integral-action (PIAC) control step to produce respective PIAC output signals;
   quadratically adding together the respective PIAC output signals;
   producing a square root signal based on the square root of the sum of the quadratically added PIAC signals;
   unilaterally limiting the equidistant output signal of the current/voltage controller as a function of said square root signal, such that the current/voltage controller has increasing spare control capacity with increases in value of the square root signal, corresponding to a greater amplitude of the harmonic to be attenuated, wherein the square root signal is weighted and delayed time by a predetermined second time interval before it limits the equidistant output signal of the current/voltage controller.

19. Method according to claim 18, wherein the alternating current system is a three-phase system and each alternating-current switch is driven in three phases, and the output signal of each proportional/integral-action control step is subjected to a two-phase/three-phase coordinate transformation referenced against a system-frequency reference frequency before it is phase-shifted by 90°.

* * * * *